United States Patent Office 3,040,158
Patented June 19, 1962

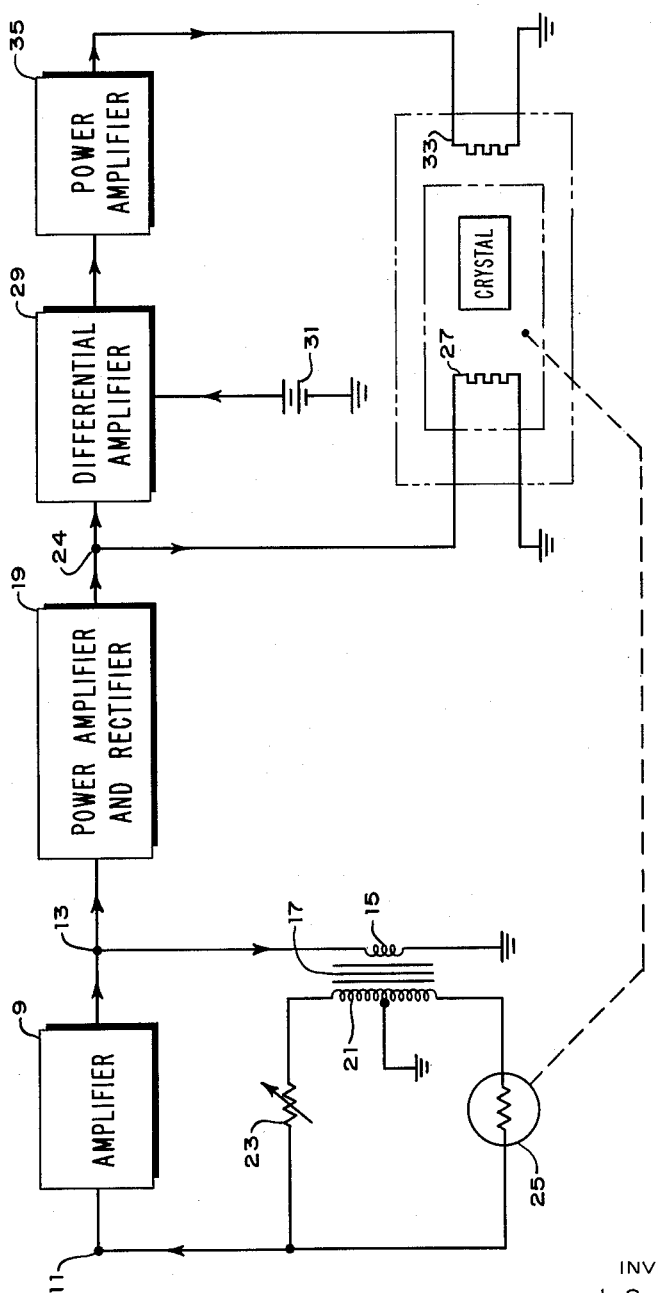

3,040,158
PROPORTIONAL TEMPERATURE CONTROLLER
Leonard S. Cutler, Palo Alto, Alan S. Bagley, Los Altos Hills, and La Thare N. Bodily, Palo Alto, Calif., assignors to Hewlett-Packard Company, Palo Alto, Calif., a corporation of California
Filed Dec. 1, 1960, Ser. No. 72,912
12 Claims. (Cl. 219—20)

This invention relates to temperature control circuits and more particularly to the method and means of maintaining the temperature within a two-stage crystal oven at a substantially constant value using one temperature sensing element.

Quartz crystals which show a piezoelectric effect are used in very stable frequency standards. The frequency at which the crystal oscillates is determined by the orientation of crystal lattice axes within the crystal, crystal thickness, ambient temperature, amplitude of oscillation, and other factors. Many of these frequency determining factors are controlled in the fabrication of the crystal and in the design of the circuit with which it is used.

The temperature at which the crystal operates is generally maintained at a substantially constant value by one of several techniques commonly known in the art. A crystal oven to maintain the operating temperature of the crystal at a substantially constant value above room temperature is one of the more commonly used techniques. A temperature responsive element is generally used to sense the internal oven temperature and to control the power applied to the oven. In this manner, the internal oven temperature, and hence the temperature at which the crystal operates, is maintained at a relatively constant value. However, sudden changes in the ambient or room temperature in which the oven operates may produce variations in the internal oven temperature. And if the sensing element is a temperature sensitive switch, the oven temperature will fluctuate between the turn-on and turn-off temperatures to which the switch is set. The temperature in a typical switch-controlled oven may vary between 64 and 66 degrees centigrade.

If a more critical control of the oven temperature is required, a continuously controllable heat source is used to provide the elevated temperature within the crystal oven. An oven of the type that is enclosed within another oven is generally employed to provide the constant internal oven temperature at which the crystal operates, and also to provide a controlled environmental temperature for the internal oven. In this manner, the variations in the surrounding temperature produce only negligible changes in the internal oven temperature. A temperature sensing element is generally employed in each of the oven chambers to maintain the temperatures therein at constant values. It is desirable to control the temperature at which a crystal operates, i.e., the temperature of the inner chamber, and the temperature of the outer chamber using one sensing element in order to reduce the complexity of the heat-controlling circuit and concomitant expense.

Accordingly, it is an object of the present invention to provide an inexpensive heat-controlling circuit to control the temperature of each chamber of a two-stage oven.

It is another object of the present invention to provide a heat-controlling circuit for a two-stage oven which uses one temperature sensing element.

Other and incident objects of the present invention will be apparent from a reading of this specification and an inspection of the accompanying drawing which shows a schematic diagram of a heat controlling circuit in accordance with the present invention.

Referring now to the drawing, there is shown an amplifier 9 with input terminal 11 and output terminal 13. Output terminal 13 is connected to the primary winding 15 of transformer 17, and to the input of power amplifier and rectifier 19. The end terminals of the center-tapped secondary winding 21 are connected through resistor 23 and through thermistor 25 to the input terminal 11 of amplifier 9. The output of power amplifier and rectifier 19 is connected to the inner chamber heating element 27, and to one input terminal of differential amplifier 29. A reference voltage 31 is applied to the other input terminal of differential amplifier 29. The output of differential amplifier 29 is connected to the outer chamber heating element 33 through power amplifier 35.

In operation, amplifier 9, and the circuit including transformer 17 which connects the output terminal to the input terminal of amplifier 9, operates as a positive or negative feedback amplifier, depending upon the relationship between the values of resistor 23 and thermistor 25. If, for example, the operating temperature of the oven is below the desired value, the relationship between the value of resistor 23 and the resistance of temperature sensing thermistor 25 will be sufficiently unbalanced to provide positive feedback around the loop. The gain around the loop is chosen sufficiently high to support oscillations. The oscillatory waveform appearing at output terminal 13 of amplifier 9 is applied to the input of power amplifier and rectifier 19. The unidirectional voltage appearing at output terminal 24 is applied to one input terminal of differential amplifier 29 and to the inner chamber heating element 27. The voltage applied to heating element 27 thus serves to increase the temperature of the inner chamber. Thermistor 25, or other temperature sensitive impedance, is adapted to sense the temperature within the inner chamber of the oven. As the temperature of the inner chamber increases and the resistance of thermistor 25 approaches the value of resistor 23, the gain around the positive feedback loop more closely approaches unity and thus the amplitude of the oscillatory waveform at output terminal 13 diminishes. The reduced amplitude of the waveform at output terminal 13 causes the voltage applied to heater element 27 to reduce, thereby reducing the heat supplied to the inner chamber. Equilibrium is established when the heat supplied to the inner chamber by heating element 27 is substantially equal to the heat dissipated by the inner chamber. Under this operating condition, the gain around the positive feedback loop is exactly unity and is sufficient to maintain the amplitude of the waveform at output terminal 13 at a value which maintains the temperature of heating element 27 at equilibrium value.

At the same time, the voltage appearing across heating element 27 is compared with the reference voltage 31 in differential amplifier 29. The output signal of differential amplifier 29 is amplified by power amplifier 35 and is applied to the outer chamber heating element 33. Thus, at the beginning of the heating cycle, when a large voltage is applied across heating element 27, a large difference voltage is amplified by differential amplifier 29 and power amplifier 35 and is applied to heating element 33. The outer chamber temperature is thus increased by the heat supplied by heating element 33 until equilibrium is reached. Under this condition, the voltage that appears at terminal 24 is substantially equal to reference voltage 31. Any small difference between the two voltages is amplified and is applied to heating element 33, which element provides the heat necessary to maintain the outer chamber in equilibrium.

If for some reason the temperature of the inner chamber drops below the value of equilibrium, the unbalance between resistor 23 and thermistor 25 causes the oscillations appearing at terminal 13 to increase in amplitude. This, in turn, produces a larger unidirectional voltage across heating element 27, and a larger voltage at the input of differential amplifier 29 with respect to reference voltage 31. The difference signal is amplified by power amplifier 35 and is applied to the outer chamber heating element 33. The temperature of the inner chamber, then, is increased by the heat supplied by heating element 27, and by the heat which flows from the outer chamber to the inner chamber.

If the gain of the amplifier 9 is substantially constant and the rectification characteristic of the rectifier of the power amplifier and rectifier 19 is substantially linear in the region of normal operation, then the voltage that appears at input terminal 24 of differential amplifier 29 is proportional to the voltage that appears across the thermistor 25. If the gain of the circuit between input terminal 24 and the outer chamber heating element 33 is then made very large, the power level at which thermistor 25 operates remains substantially unchanged with changes in ambient temperature and the inner oven temperature therefore remains unchanged, regardless of changes in the ambient temperature.

Therefore, the temperature control circuit of the present invention provides accurate control of the inner chamber temperature with only one temperature sensing element. In addition, the circuit of the present invention permits adjustment of the inner chamber temperature over a limited range by the adjustment of a precision resistor in the circuit which constitutes an oscillating loop. Further, the circuit of the present invention responds only to changes in temperature of the inner chamber, and is thus less complex than circuits which independently maintain the inner and outer chamber temperatures at substantially constant values.

We claim:

1. The method of controlling the temperature of the inner and outer chambers of a two stage crystal oven wherein the inner and outer chambers are adapted to be heated electrically, said method comprising producing an oscillatory waveform having an amplitude that is related to the desired inner chamber temperature less the actual inner chamber temperature, electrically heating said inner chamber in proportion to the amplitude of said oscillatory waveform, obtaining a control signal that is related to the amplitude of said oscillatory waveform less the amplitude of a reference signal, and electrically heating said outer chamber in proportion to the amplitude of said control signal.

2. The method of controlling the temperature of the inner and outer chambers of a two-stage crystal oven wherein the inner and outer chambers are adapted to be heated electrically, said method comprising producing an oscillatory waveform having an amplitude that is related to the desired inner chamber temperature, less the actual inner chamber temperature, producing a unidirectional electrical signal having an amplitude that is related to the amplitude of said oscillatory waveform, electrically heating said inner chamber in proportion to the amplitude of said unidirectional signal, comparing said unidirectional signal with a unidirectional reference signal, obtaining a control signal having an amplitude that is proportional to the amplitude of said unidirectional signal less the amplitude of said unidirectional reference signal and electrically heating said outer chamber in proportion to the amplitude of said control signal.

3. The method of controlling the temperature of the inner and outer chambers of a two stage crystal oven wherein the inner and outer chambers are adapted to be heated electrically, said method comprising producing an oscillatory waveform having an amplitude that is related to the desired inner chamber temperature, less the actual inner chamber temperature, producing a unidirectional electrical voltage having an amplitude that is related to the amplitude of said oscillatory waveform, electrically heating said inner chamber in proportion to the amplitude of said unidirectional voltage, comparing said unidirectional voltage with a unidirectional reference voltage, obtaining a control voltage having an amplitude that is proportional to the amplitude of said unidirectional voltage less the amplitude of said unidirectional reference voltage and electrically heating said outer chamber in proportion to the amplitude of said control voltage.

4. A circuit for controlling the temperature of the inner and outer chambers of a two stage crystal oven, said circuit comprising inner and outer chamber heating elements, temperature sensing means adapted to sense the temperature of the inner chamber, means including said temperature sensing means adapted to oscillate at a predetermined frequency, said temperature sensing means serving to limit the amplitude of the oscillations to a value that is related to the desired temperature less the actual temperature of the inner chamber, means to apply to said inner chamber heating element a first signal voltage that is related to the amplitude of said oscillations, a reference signal voltage, means to apply to said outer chamber heating element a second signal voltage that is related to the difference in amplitude of said reference signal voltage and said first signal voltage.

5. A circuit for controlling the temperature of the inner and outer chambers of a two stage oven, said circuit comprising inner and outer chamber heating elements, temperature sensing means adapted to sense the temperature of the inner chamber, an oscillator comprising said temperature sensing element adapted to produce a constant frequency output signal, said temperature sensing means adapted to determine the amplitude of said output signal, means to apply a unidirectional voltage to said inner heating element that is proportional to the amplitude of said output signal, a source of reference potential, and means to apply to said outer heating element a unidirectional voltage that is proportional to the difference between said reference potential and the unidirectional voltage applied to said inner chamber heating element.

6. A circuit for controlling the temperature of the inner and outer chambers of a two stage crystal oven, said circuit comprising inner and outer chamber heating elements, temperature sensing means adapted to sense the temperature of the inner chamber, means including said temperature sensing means adapted to oscillate at a predetermined frequency, means including said temperature sensing means serving to limit the amplitude of the oscillations to a value that is related to the desired temperature less the actual temperature of the inner chamber, means including a rectifier to apply to said inner chamber heating element a first unidirectional voltage that is related to the amplitude of said oscillations, a unidirectional reference voltage, means to apply to said outer chamber heating element a second unidirectional voltage that is related to the difference in amplitude of said reference voltage and said first voltage.

7. A circuit for controlling the temperature of the inner and outer chambers of a two-stage oven, said circuit comprising inner and outer chamber heating elements, a temperature sensing element adapted to sense the temperature of the inner chamber, an amplitfier having input and output terminals, means including a transformer having a center tapped secondary winding and connecting the output terminal to the input terminal of said amplifier, means including said temperature sensing element and adapted to produce a constant frequency output signal, said temperature sensing element being adapted to determine the amplitude of said output signal, means to apply a unidirectional voltage to said inner heating element that is proportional to the amplitude of said output signal, a source of reference potential, and means to apply to said outer heating element a unidirectional voltage that is proportional to the difference between said reference potential and the unidirectional voltage applied to said inner chamber heating element.

8. Apparatus to control the environmental temperature of an element, said apparatus comprising an inner chamber having a heater and a temperature-sensing element, an outer chamber having a heater, means including said temperature-sensing element and responsive to the temperature in said inner chamber to energize the heater of said inner chamber, a source of reference signal, circuit means to compare the signal appearing across the heater of said inner chamber with said reference signal, and means to energize the heater of said outer chamber in response to the output of said circuit means.

9. Apparatus to control the environmental temperature of an element, said apparatus comprising an inner chamber enclosing said element and having a heater and a temperature-sensing element, an outer chamber enclosing said inner chamber and having a heater, means including said temperature-sensing element and responsive to the temperature in said inner chamber to energize the heater of said inner chamber, a source of reference signal, means to produce an error signal related to the difference between the signal appearing across the heater of said inner chamber and said reference signal, and means responsive to said error signal to energize the heater of said outer chamber.

10. An oven for controlling the environmental temperature of an element, said oven comprising an inner chamber enclosing said element and having a heater and a temperature-sensing element, an outer chamber enclosing said inner chamber and having a heater, a source of power, means including said temperature-sensing element and responsive to the temperature in said inner chamber to apply power from said source to the heater of said inner chamber, a source of reference signal, means to produce an error signal related to the difference between the signal appearing across the heater of said inner chamber and said reference signal, and means responsive to said error signal to energize the heater of said outer chamber.

11. An oven for controlling the environmental temperature of an element, said oven comprising an inner chamber enclosing said element and having a heater and a temperature-sensing element, an outer chamber enclosing said inner chamber and having a heater, a source of power, means including said temperature-sensing element and responsive to the temperature in said inner chamber to control the power from said source applied to the heater of said inner chamber, a source of reference potential, means to produce a unidirectional voltage related to the power applied to the heater of said inner chamber, means producing an error signal related to the difference between said unidirectional voltage and said reference potential, and means responsive to said error signal to energize the heater of said outer chamber.

12. An oven for controlling the environmental temperature of an element, said oven comprising an inner chamber having a heater and a temperature-sensing element, an outer chamber having a heater, means including said temperature-sensing element to produce an oscillatory signal having an amplitude related to the temperature in said inner chamber, means responsive to the amplitude of said oscillatory signal to energize the heater of said inner chamber, a source of reference signal, means to produce an error signal related to the difference between the signal appearing across the heater of said inner chamber and said reference signal, and amplifier means responsive to said error signal to energize the heater of said outer chamber.

References Cited in the file of this patent

UNITED STATES PATENTS

| | | |
|---|---|---|
| 2,794,105 | Brandenberger | May 28, 1957 |
| 2,829,231 | Troost | Apr. 1, 1958 |
| 2,973,420 | Craiglow et al. | Feb. 28, 1961 |